(12) United States Patent
Hasegawa et al.

(10) Patent No.: US 7,266,140 B1
(45) Date of Patent: Sep. 4, 2007

(54) GPS POSITIONING METHOD AND GPS RECEPTION APPARATUS

(75) Inventors: Koji Hasegawa, Kanagawa (JP); Mikio Wakamori, Kanagawa (JP); Haruo Kanetsuna, Ibaraki (JP)

(73) Assignee: Sony Corporation, Shinagawa-ku (JP)

( * ) Notice: Subject to any disclaimer, the term of this patent is extended or adjusted under 35 U.S.C. 154(b) by 965 days.

(21) Appl. No.: 09/685,412

(22) Filed: Oct. 10, 2000

(30) Foreign Application Priority Data

Oct. 15, 1999 (JP) .............................. P11-293630

(51) Int. Cl.
*H04B 1/00* (2006.01)
(52) U.S. Cl. .................................. 375/130; 342/357.01
(58) Field of Classification Search .............. 375/136, 375/147, 137, 149, 326, 349, 347, 367; 342/357.05, 342/357.06, 357.07, 357.12, 357.09, 357.1
See application file for complete search history.

(56) References Cited

U.S. PATENT DOCUMENTS

| | | | | |
|---|---|---|---|---|
| 5,864,315 A | * | 1/1999 | Welles et al. | 342/357.12 |
| 6,064,336 A | * | 5/2000 | Krasner | 342/357.05 |
| 6,150,980 A | * | 11/2000 | Krasner | 342/357.1 |
| 6,178,195 B1 | * | 1/2001 | Durboraw et al. | 375/136 |
| 6,300,899 B1 | * | 10/2001 | King | 342/357.12 |

* cited by examiner

*Primary Examiner*—Khanh Tran
(74) *Attorney, Agent, or Firm*—Oblon, Spivak, McClelland, Maier & Neustadt, P.C.

(57) ABSTRACT

A GPS positioning method is disclosed which can shorten the time required until positioning arithmetic operation is started after power is made available. An oscillation frequency of a reference frequency oscillator used in a GPS receiver section or a frequency variation of the oscillation frequency is measured using high precision frequency information provided by a standard wave. A result of the measurement is utilized to catch a signal from a GPS satellite. Further, a synchronization timing of a spread code of the spread spectrum signal from the satellite is detected to detect a small time component for time synchronization. After synchronization of the spread code is completed, a time of the boundary of one period of the spread code is detected from time information provided by a standard wave, and a time component greater than the small time component for time synchronization is detected based on the time of the boundary. Time synchronism is established using the detected small time component and the time component greater than the small time component.

12 Claims, 12 Drawing Sheets

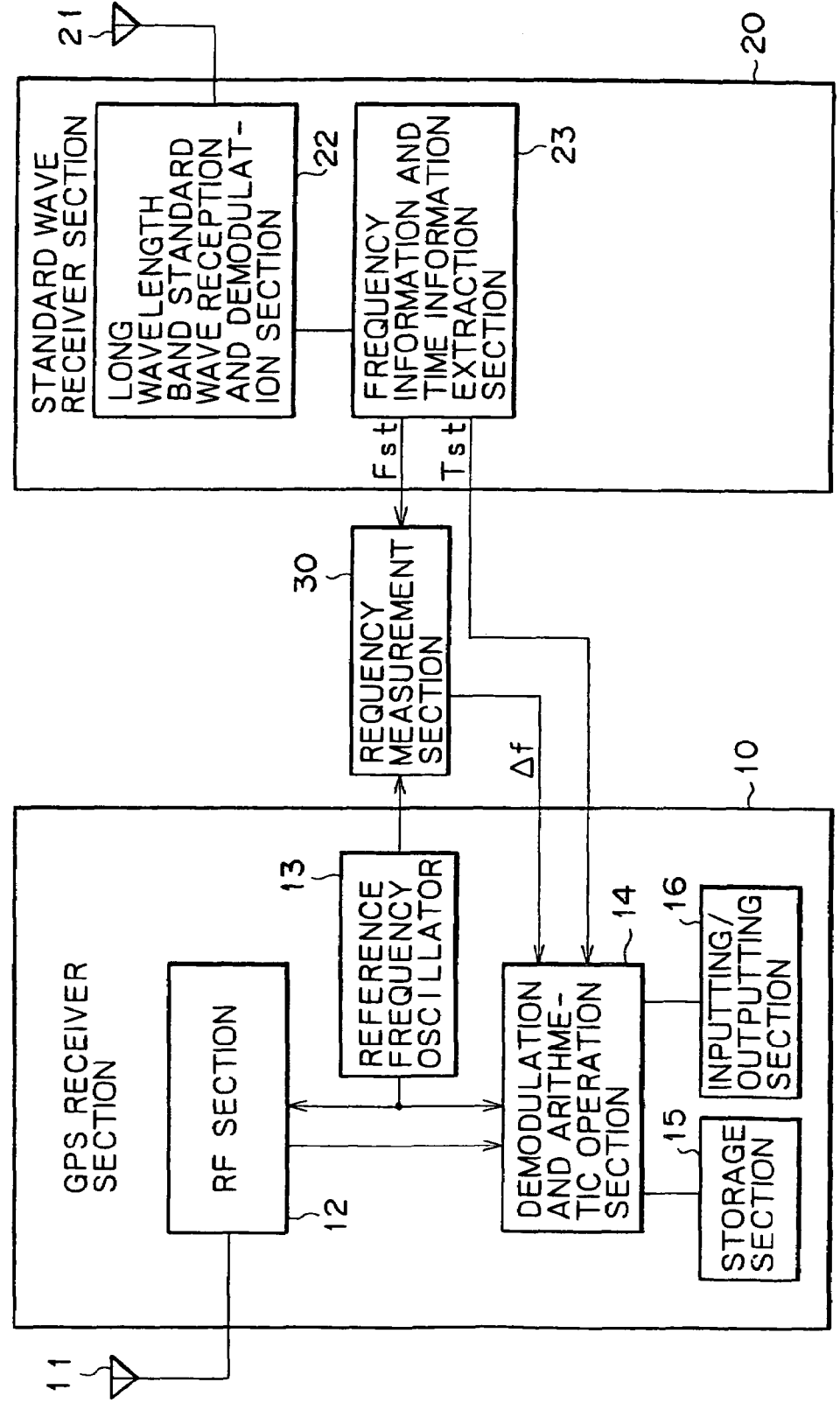

FIG. 2

| CALL SIGN | JJY (STANDARD FREQUENCY STATION) | |
|---|---|---|
| TRNSMITTING STATION | OTAKADOYA MOUNTAIN STANDARD WAVE TRANSMITTING STATION (MIYAKOJI VILLAGE, TAMURA-GUM, FUKUSHIMA-KEN) | NTT NAZAKI RADIO TRANSMITTING STATION (MIWA-CHO, SARUSHIMA-GUM, IBARAGI-KEN) |
| LATITUDE<br>LONGITUDE | 37° 22′ N<br>140° 51′ E | 36° 11′ N<br>139° 51′ E |
| ANTENNA TYPE | UMBRELLA-SHAPE 250 m HIGH | $\lambda/2$ HORIZONTAL DIPOLE (5, 8MHz)<br>$\lambda/2$ HORIZONTAL DIPOLE (10MHz) |
| ANTENNA POWER | 50kW<br>(EFFECTIVE RADIATION POWER 10 kW) | 2kW |
| TYPE OF EMISSION | A1B | AXW |
| OPERATION TIME | ALWAYS | ALWAYS<br>(EXCEPT 35 TO 39 MINUTES EVERY HOUR) |
| STANDARD FREQUENCY — CARRIER | 40kHz | 5MHz, 8MHz, 10MHz |
| STANDARD FREQUENCY — MODULATION WAVE | 1Hz (SECOND SIGNAL) | 1Hz (SECOND SIGNAL), 1kHz |
| STANDARD FREQUENCY — AMPLITUDE OF MODULATION WAVE | MAXIMUM 100%, MINIMUM 10% (EXCEPT DURING TRANSMISSION OF CALL SIGN) | |
| STANDARD TIME | JST: CONVENTIONAL UNIVERSAL TIME AS LEAD BY 9 HOURS | |
| TRANSMISSION TIME OF SECOND SIGNAL | ALWAYS | ALWAYS |
| MODULATION TIME ACCORDING TO LOW FREQUENCY STANDARD | NO | 0-5 MINUTES, 10-15 MINUTES, 20-25 MINUTES, 30-35 MINUTES, 40-45 MINUTES, 50-55 MINUTES |
| ACCURACY OF FREQUENCY AND TIME INTERVAL | $\pm 1 \times 10^{-12}$ | $\pm 1 \times 10^{-11}$ |
| FROM OF SECOND SIGNAL | MARKS OF 0.2, 0.5, 0.8 SECONDS | 8 CYCLES OF 1,600 Hz |
| DUT1 SIGNAL | NO | BY SPECIAL SECOND SIGNAL OF 1,600 Hz 45 MILLISECOND WIDTH |
| REMARKS | OPENED ON JUNE 10, 1999 (HEISEI 11) | REVISED ON APRIL 1, 1996 (HEISEI 8) PLANNED TO ABANDON ON MARCH 31, 2001 (HEISEI 13) |

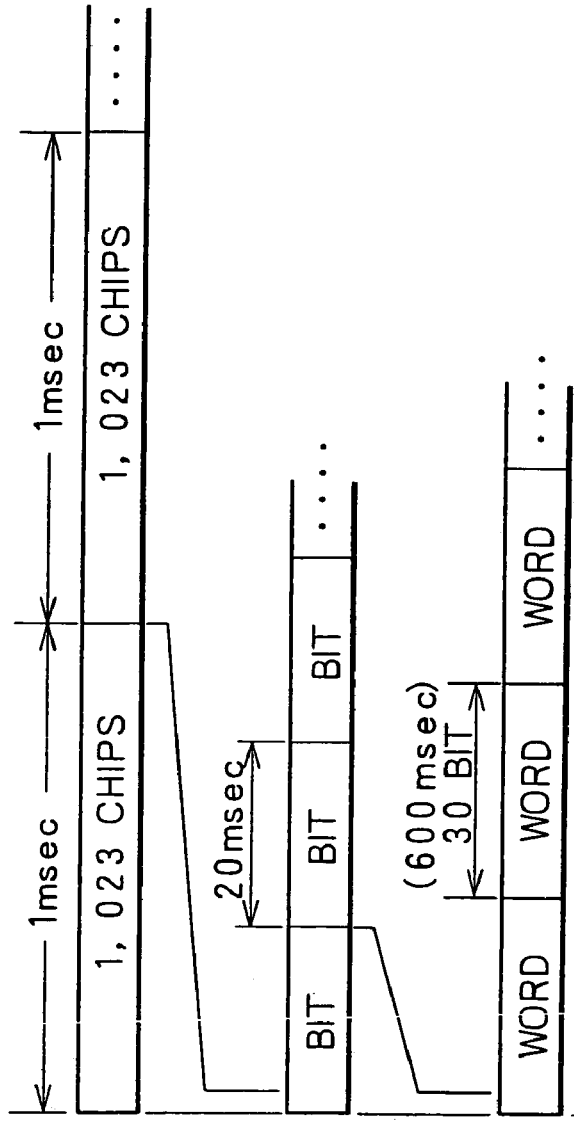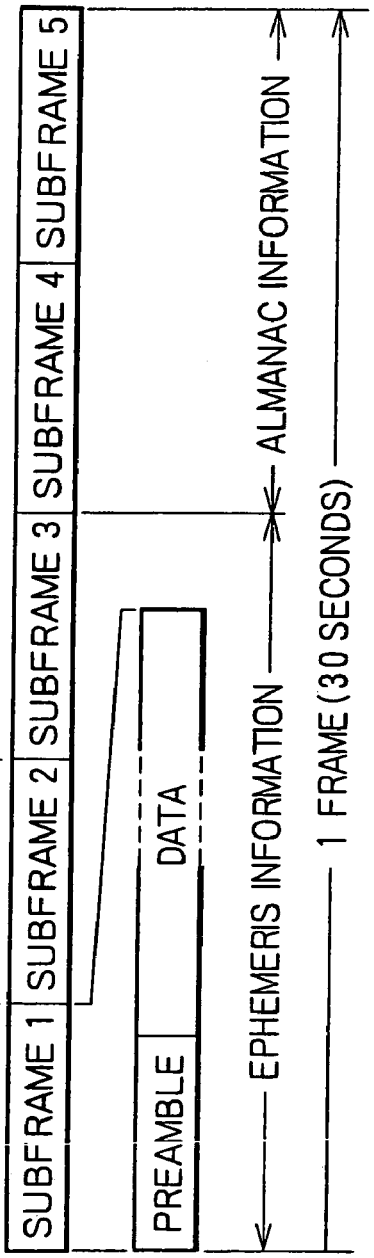

GPS POSITIONING METHOD AND GPS RECEPTION APPARATUS

BACKGROUND OF THE INVENTION

This invention relates to a GPS (Global Positioning System) positioning method and a GPS reception apparatus to which the method is applied.

In a GPS system wherein a plurality of artificial satellites called GPS satellites are utilized to measure the position of a moving body, a spread spectrum modulation system is used as a modulation system for signal waves from the artificial satellites. For example, in a consumer GPS receiver, spread spectrum signal waves called C/A codes (Course Acquisition Codes) from GPS satellites (Navistar's) are received to perform positioning arithmetic operation.

The C/A code is formed from a code of a PN (Pseudo random Noise) series whose transmission signal rate is 1.023 MHz, for example, a Gold code. The code of the PN series repetitively appears with one period thereof provided by 1,023 chips (accordingly, one period=1 millisecond) as seen from FIG. 13A.

The code of the PN series of the C/A code is different among different satellites, but it can be detected by a GPS receiver in advance by which satellite a code of any given PN series is used. Further, such a navigation message as hereinafter described allows a GPS receiver to discriminate a signal from which satellite the GPS receiver can receive at the spot and at the point of time. Accordingly, if it is tried to perform, for example, three-dimensional positioning using a GPS receiver, then the GPS receiver receives radio waves from four or more satellites which can be caught at the spot and at the point of time and performs spectrum despreading of the radio waves and positioning arithmetic operation to determine the position of the GPS receiver itself.

As seen in FIG. 13B, one bit of satellite signal data is transmitted as codes of a PN series for 20 periods, that is, in a unit of 20 milliseconds. In other words, the data transmission rate is 50 bps. When the bit is "1", 1,023 chips of codes of a PN series for one period have inverse values to those when the bit is "0".

As seen from FIG. 13C, in the GPS system, one word is formed from 30 bits (600 milliseconds). Then, one subframe (6 seconds) is formed from 10 words as seen from FIG. 13D. As seen from FIG. 13E, a preamble which normally has a prescribed bit pattern even when data are updated is inserted in the top word of one subframe, and data are transmitted following the preamble.

Further, one frame (30 seconds) is formed from 5 subframes. A navigation message is transmitted in a data unit of one frame. The first 3 subframes of data of one frame include information unique to each satellite called ephemeris information. The information includes parameters to be used for determination of a trajectory of the satellite and a signaled time of the signal from the satellite.

In particular, the second words of the three subframes of the ephemeris information include information of a time from a week called TOW (Time of Week). Accordingly, the TOW of each subframe is information updated at intervals of 6 seconds.

All of the GPS satellites include an atomic clock and use common time information, and a signal is signaled from each satellite in a unit of one second of the atomic clock. Further, codes of a PN series of each satellite are produced in synchronism with the atomic clock.

The trajectory information of the ephemeris information is updated after each several hours, and the information remains fixed until it is updated. However, if the trajectory information of the ephemeris information is stored in a memory of a GPS receiver, then the same information can be used with a high degree of accuracy for several hours. It is to be noted that the signaled time of a signal from each satellite is updated after each one second.

The navigation message of the remaining two frames of data of one frame is information called almanac information which is transmitted commonly from all of the satellites. The almanac information must be collected for 25 frames in order to acquire all of the information and includes rough position information of each satellite and information representative of which satellites can be used. The almanac information is updated after each several months, but remains the same information until it is updated. However, if the almanac information is stored in a memory of a GPS receiver, then the same information can be used with a high degree of accuracy for several months.

In order to receive a GPS satellite signal, a code of a PN series which is prepared in a GPS receiver and is same as the PN series of the C/A code used by a GPS satellite to be received is used to establish phase synchronism with the C/A code of the signal from the GPS satellite to catch the satellite signal, and the satellite signal is spectrum despread. A code of a PN series is hereinafter referred to as PN code. As phase synchronism with the C/A code is established and despreading is performed, bits are detected, and consequently, a navigation message including time information and so forth can be acquired from the GPS satellite signal.

A satellite signal is caught by a phase synchronism search of the C/A code. In the phase synchronism search, a correlation between the PN code of the GPS receiver and the PN code of a reception signal from a GPS satellite and, when the correlation is higher than a correlation value determined in advance, it is discriminated that the PS codes are in synchronism with each other. If it is discriminated that the PS codes are not in synchronism with each other, then the phase of the PN code of the GPS receiver is successively shifted one by one chip while a correlation of the PN code of the GPS reception signal to the PN code of the GPS receiver is detected for each phase to detect the phase with which synchronism can be established.

In this instance, the PN code of the GPS satellite is driven with a clock of a very high precision frequency. Accordingly, if the clock for driving a generator of a PN code prepared in the GPS receiver has a degree of accuracy substantially equal to that of a clock of a satellite, then if the PN code of the GPS receiver is shifted through 1,023 chips, i.e. one period of repetition of the PN code, then phase synchronism is obtained with some phase and a spread spectrum wave from the satellite can be caught.

The clock for driving the generator of the PN code of the GPS receiver is usually obtained by dividing the frequency of a reference frequency oscillator prepared in the GPS receiver. A high precision quartz oscillator is used as the reference frequency oscillator. However, the oscillation frequency of the reference frequency oscillator of the GPS receiver is usually fluctuated by a temperature variation or a secular change. Therefore, there is the possibility that the chip frequency of the PN code may be displaced between the satellite signal and the signal of the GPS receiver. Therefore, the GPS receiver performs a frequency search so that the oscillation frequency of the built-in reference frequency oscillator may be adjusted to the frequency of the spread spectrum signal from the GPS satellite taking a variation of the oscillation frequency of the built-in reference frequency oscillator into consideration.

FIG. 14 illustrates such a frequency search as just mentioned. In particular, such a phase synchronism search as described above is performed when the frequency of the clock signal for driving the PN code generator of the GPS receiver is a certain frequency f1. Then, if a phase with which synchronism is detected is not found in the phase search for all of 1,023 chips for which the phase synchronism search is performed, then, for example, the dividing ratio of the signal from the reference frequency oscillator is varied to vary the frequency of the driving clock signal to another frequency f2. Then, a phase search for 1,023 chips is performed similarly. This is repeated by successively changing the frequency of the driving clock signal stepwise as seen in FIG. 14. The operation described is a frequency search.

A frequency of the driving clock signal which can be considered to allow synchronization is detected by the frequency search, and final phase synchronization of the PN code is performed with the clock frequency. Consequently, even if the oscillation frequency of the quartz frequency oscillator has some displacement, the satellite signal can be caught.

By the way, in order to perform positioning arithmetic operation on the GPS receiver, the distance between the satellite and the receiver must be determined. In particular, the GPS receiver measures a time interval, that is, a signal arrival time interval, until a signal forwarded from the satellite at a certain time arrives at the GPS receiver and multiplies the time interval by the velocity of light $3 \times 10^8$ m/s to calculate the distance.

In order to measure the signal arrival time interval, it is necessary to establish precise time synchronism with a signal from the satellite and measure two kinds of time intervals. One of the two time intervals is time information shorter than one period of a spread code obtained by establishing phase synchronism with the C/A code, that is, time information shorter than 1 milliseconds. The other time interval is time information longer than one period of a spread code, that is, time information longer than 1 millisecond.

The time information shorter than 1 millisecond is obtained as a timing at which phase synchronism of the C/A code is established to catch the GPS satellite signal. In particular, since the spread code (PN code) of the satellite is in synchronism with its atomic clock, if phase synchronism of the PN code is established on the GPS receiver, that is, if synchronism of the C/A code is established, then information shorter than 1 millisecond of the arrival time interval of a radio wave from the satellite is obtained.

However, only if synchronism of the C/A code is established, only time information shorter than 1 millisecond is obtained, but time information longer than 1 millisecond is not obtained. Therefore, time information longer than 1 millisecond is necessitated. Conventionally, such time information longer than 1 millisecond is obtained by acquiring a navigation message included in a signal from the GPS satellite. In particular, time information longer than 1 millisecond is obtained by establishing phase synchronism with the preamble pattern in the navigation message and referring to the TOW to confirm the phase synchronism timing.

As described above, in the conventional GPS receiver, in order to catch a satellite signal, a frequency search is required due to a temperature variation or a secular change of the reference frequency oscillator provided in the GPS receiver. Since comparatively much time is normally required for the frequency search, there is a problem that much time is required until positioning arithmetic calculation is performed finally to measure the position of the GPS receiver at present.

Where the conventional time synchronization method described above is used, there is a problem that information of the preamble and the TOW for acquiring time information longer than 1 millisecond is obtained in a unit of a subframe, that is, only once in 6 seconds. Besides, in order to prevent erroneous locking, it is preferable to confirm information of the preamble and so forth usually two or more times. Therefore, the time required until final time synchronism is established after synchronism between the signal from the satellite and the C/A code is established is more than 6 seconds even if the time information the GPS receiver has is valid.

The time of more than 6 seconds makes an obstacle if it is tried to shorten the time required until positioning arithmetic operation is started after power is made available. Further, where it is intended to incorporate the GPS positioning system in a portable apparatus, although power saving is demanded, such power saving cannot be achieved sufficiently because the prior art requires much time until positioning arithmetic operation is started as described above.

SUMMARY OF THE INVENTION

It is an object of the present invention to provide a GPS positioning method and a GPS reception apparatus by which time required, for example, until time synchronism is established after power is made available to a GPS receiver can be shortened.

In order to attain the object described above, according to an aspect of the present invention, there is provided a GPS positioning method, comprising the steps of acquiring high precision frequency information provided by a standard wave, measuring an oscillation frequency of a reference frequency oscillator used in a GPS receiver section or a frequency variation of the oscillation frequency using the received high precision frequency information, and utilizing a result of the measurement to catch a signal from a GPS satellite.

In the GPS positioning method, even if the oscillation frequency of the reference frequency generator of the GPS receiver section is varied by a temperature variation or a secular change, the frequency variation is measured based on the high precision frequency information provided by the standard wave called radio clock, and a result of the measurement is utilized to catch a signal from a GPS satellite so that the frequency variation can be cancelled. Consequently, the GPS satellite signal can be caught rapidly without using a frequency search which is used in a conventional GPS positioning method.

Preferably, the GPS positioning method further comprises the steps of acquiring high precision time information provided by the standard wave, and performing positioning arithmetic operation using the high precision time information in place of time information sent from the GPS satellite.

In the GPS positioning method, since the positioning arithmetic operation is performed using the high precision time information, which is provided by the standard wave and normally obtained, in place of the time information sent from the GPS satellite, the positioning arithmetic operation can be started rapidly when compared with a conventional GPS positioning method.

As an alternative, the GPS positioning method may further comprise a first step of detecting a synchronization timing regarding a spread code of a spread spectrum signal from the GPS satellite to detect a time component shorter than one period of the spread code for time synchronization, and a second step of detecting, after the synchronization of the spread code is completed in the first step, a time at a boundary of one period of the spread code from the high precision time information provided by the standard wave and detecting a time component longer than one period of the spread code for the time synchronization based on the time of the boundary.

In the GPS positioning method, a time component shorter than 1 millisecond which is one period of the spread code is determined by establishing synchronism of the C/A code similarly as in a conventional GPS positioning method. However, as regard a time component longer than 1 millisecond, the time of the boundary of one period of the spread code is detected from the high precision time information which can be obtained from the standard wave. In this instance, time synchronism of a sufficiently high degree of accuracy can be established if the time information obtained from the radio watch has an accuracy shorter than 500 microseconds. Thus, by establishing time synchronism in a similar manner as described above with regard to three or four satellites, the positioning arithmetic operation can be started rapidly.

Accordingly, with the GPS positioning method, there is no necessity of checking the preamble or the TOW of a navigation message as in a conventional GPS positioning system, and consequently, the time required for time synchronization can be shortened significantly.

As another alternative, the GPS positioning method may further comprise a first step of detecting a synchronization timing regarding a spread code of a spread spectrum signal from the GPS satellite to detect a time component shorter than one period of the spread code for time synchronization, and a second step of detecting, after the synchronization of the spread code is completed in the first step, a boundary of a bit of information from the satellite, detecting the time of the boundary of the bit with the high precision time information provided by the standard wave and detecting a time component longer than one period of the spread code for the time synchronization.

In the GPS positioning method, a time component shorter than 1 millisecond is determined by establishing synchronism of the C/A code similarly as in a conventional GPS positioning method. However, as regards a time component longer than 1 millisecond, the time of the boundary of a bit which corresponds to 20 periods of the spread code is detected from the high precision time information which is provided by the standard wave. In this instance, time synchronism of a sufficiently high degree of accuracy can be established if the time information obtained by the GPS receiver has an accuracy shorter than 10 microseconds. Thus, by establishing time synchronism in a similar manner as described above with regard to three or four satellites, the positioning arithmetic operation can be started rapidly.

Accordingly, with the GPS positioning method, there is no necessity of checking the preamble or the TOW of a navigation message as in a conventional GPS positioning system, and consequently, the time required for time synchronization can be shortened significantly and besides time information of a lower degree of accuracy can be used by the GPS receiver section.

Preferably, even when power to the GPS receiver section is off, power is kept supplied to the frequency oscillator of the GPS receiver section so that the frequency of the frequency oscillator or a frequency variation of the frequency is measured using the high precision frequency information provided by the received standard wave.

In the GPS positioning method, even when power to the GPS receiver section is off, the frequency variation of the reference frequency oscillator can be set in advance. Although generally a GPS receiver exhibits high power consumption, with the GPS positioning method, even if power is not normally supplied to the GPS receiver, since the frequency variation of the reference frequency oscillator can be measured in advance, the time until a satellite radio wave is caught actually after power is made available to the GPS receiver section to start catching of the satellite wave can be reduced.

In summary, with the GPS positioning method, since a satellite signal can be caught in a form wherein a frequency variation of an oscillation frequency of the reference frequency oscillator provided in the GPS receiver section is removed using high precision frequency information obtained by receiving a standard wave, a frequency search with the frequency variation of the oscillation frequency of the reference frequency oscillator taken into consideration need not be performed. Accordingly, the time until a satellite signal can be caught actually after catching of the satellite signal is started can be shortened when compared with that of the prior art.

Further, since the time information obtained from the standard wave is used in place of time information from a GPS satellite, also the time until time synchronism is established as pre-processing to positioning arithmetic operation can be reduced significantly. Accordingly, with the GPS positioning method, the time required until positioning arithmetic operation is started can be reduced significantly.

Since the time till measurement of the position after power is made available is shortened in this manner, the driving time of the GPS receiver necessary for position measurement is reduced, which contributes to power saving. Further, since the time till position measurement after power supply is made available becomes shorter, the stress of the user who uses the position measuring function can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a construction of a GPS reception apparatus according to a preferred embodiment of the present invention;

FIG. 2 is a table illustrating specifications of a standard radio wave;

FIGS. 13A to 13E are diagrams showing a structure of a GPS satellite signal.

DESCRIPTION OF THE PREFERRED EMBODIMENTS

Figure 3:
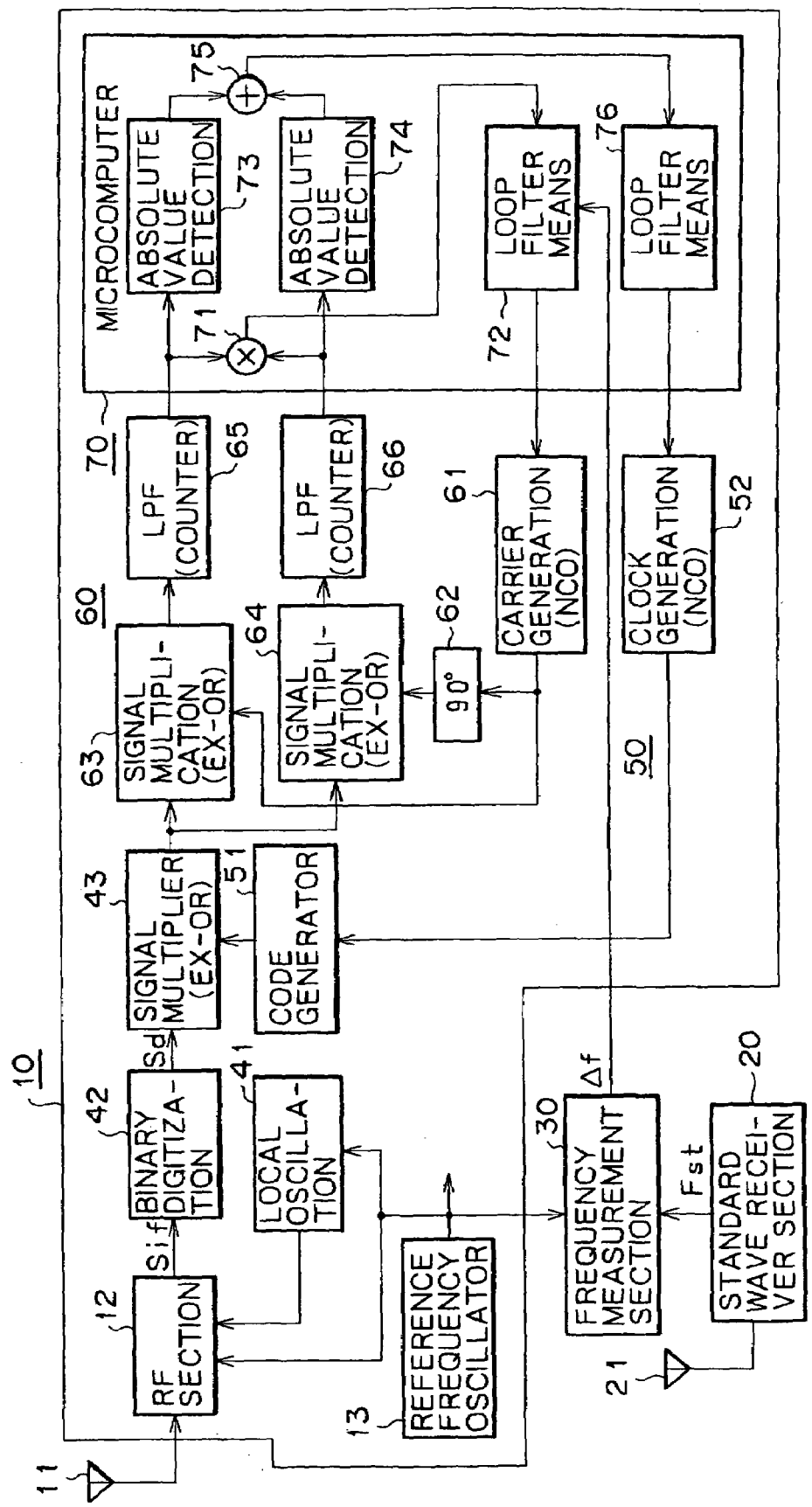
FIG. 3 is a block diagram showing a construction of a signal demodulation section of the GPS reception apparatus of FIG. 1.

Referring first to FIG. 1, there is shown a system construction of a GPS reception apparatus of the present invention to which a GPS positioning method of the present invention is applied. The GPS reception apparatus includes a GPS receiver section 10, a standard wave receiver section 20, and a frequency measurement section 30.

The GPS receiver section 10 includes an antenna section 11 which receives a GPS satellite signal and so forth and supplies the reception signal to a radio frequency processing section 12. The radio frequency processing section 12 is hereinafter referred to simply as RF section 12. The RF section 12 uses a frequency signal from a reference frequency oscillator 13 to convert the frequency of the reception signal into a signal of an intermediate frequency of several MHz to several tens MHz and outputs the intermediate frequency signal to a demodulation and arithmetic operation section 14. The demodulation and arithmetic operation section 14 establishes synchronism of the C/A code to perform demodulation by spectrum despreading and establishes time synchronism to execute positioning arithmetic operation.

The demodulation and arithmetic operation section 14 demodulates the reception signal to obtain information of the ephemeris and information of the almanac and stores the information into a storage section 15. An inputting/outputting section 16 is provided to output a result of positioning arithmetic operation and so forth or fetch necessary information.

The demodulation and arithmetic operation section 14 drives a PN code generator with a clock signal obtained using a frequency signal from the frequency measurement section 30 to generate a PN code of the receiver side, and performs phase synchronization between the PN code of the receiver side and the PN code of a satellite signal to catch the satellite signal. Then, the demodulation and arithmetic operation section 14 performs time synchronization of the caught satellite signal and executes positioning arithmetic operation.

Then, as hereinafter described in detail, when the satellite signal is caught, the demodulation and arithmetic operation section 14 performs correction of the oscillation frequency of the reference frequency oscillator 13 so that the frequency variation of the oscillation frequency by a temperature variation or a secular change of the reference frequency oscillator 13 may be ignored. Consequently, a frequency search which is required by a conventional GPS receiver can be omitted.

In particular, in the GPS reception apparatus, the frequency measurement section 30 uses high precision frequency information obtained by the standard wave receiver section 20 to measure the oscillation frequency of the reference frequency oscillator 13 or a frequency variation of the oscillation frequency, and the demodulation and arithmetic operation section 14 uses a result of the measurement to perform correction of the oscillation frequency of the reference frequency oscillator 13 in the catching circuit system of a signal from a GPS satellite so that a frequency variation of the oscillation frequency by a temperature variation or a secular change of the reference frequency oscillator 13 may be ignored to catch the signal from the GPS satellite. In the example described below, an oscillation frequency variation of the reference frequency oscillator 13 is measured, and a result of the measurement is used to catch the GPS satellite signal.

As regards time synchronization by the demodulation and arithmetic operation section 14 in the GPS reception apparatus, a time component shorter than 1 millisecond of the time synchronization is obtained by synchronizing the C/A code of a spread spectrum signal wave from a satellite in a similar manner as in the prior art. However, for example, when power is made available or upon time re-synchronization from a state wherein time synchronism is lost by a great amount, as regards a time component longer than 1 millisecond, time information on the boundary of particular data is acquired precisely using high precision time information Tst from the standard wave receiver section 20 without using the preamble or the TOW of a navigation message as in the prior art.

The standard wave receiver section 20 in the GPS reception apparatus has a construction of a radio clock which receives a standard wave in a long wavelength band. In particular, in Japan at present, a standard wave for which a carrier of a short wavelength band such as 5 MHz, 8 MHz or 10 MHz is used and another standard wave for which a carrier of a long wavelength band of 40 kHz is used as seen in FIG. 2 are utilized. In the GPS reception apparatus, the long wavelength band standard wave which is superior in accuracy in frequency and time interval and besides is wider in cover area of the radio wave is utilized.

In particular, an antenna section 21 of the standard wave receiver section 20 receives the long wavelength band standard wave and supplies a reception signal of the long wavelength band standard wave to a long wavelength band standard wave reception and demodulation section 22. The long wavelength band standard wave reception and demodulation section 22 demodulates the received long wavelength band standard wave and supplies its demodulation output to a frequency information and time information extraction section 23. The frequency information and time information extraction section 23 extracts such high precision frequency information Fst and time information Tst as described hereinabove from the demodulated long wavelength band standard wave.

Then, the frequency information and time information extraction section 23 supplies the extracted frequency information Fst to the frequency measurement section 30 so as to measure a frequency displacement of the oscillation frequency of the reference frequency oscillator of the GPS receiver section 10. The frequency measurement section 30 in the present example detects for what number of periods the frequency signal from the reference frequency oscillator 13 is included in the signal of the precise frequency of 40 kHz to measure the oscillation frequency of the reference frequency oscillator 13, and measures information of the frequency displacement Δf of the oscillation frequency based on a result of the measurement. Then, the reference frequency oscillator 13 supplies the information of the frequency displacement Δf to the demodulation and arithmetic operation section 14 of the GPS receiver section 10.

The time information Tst detected by the frequency information and time information extraction section 23 is supplied to the demodulation and arithmetic operation section 14 of the GPS receiver section 10 in order to establish time synchronism.

[Catching Method of a Satellite Signal with a Frequency Variation of the Reference Frequency Oscillator Taken into Consideration]

Now, an example of a method of catching a satellite signal wherein a frequency variation of the reference frequency oscillator 13 is cancelled by the demodulation and arithmetic operation section 14 of the GPS receiver section 10 is described.

FIG. 3 shows a construction of a signal demodulation section in the RF section 12 and the demodulation and arithmetic operation section 14 of the GPS receiver section 10 which catches and demodulates a satellite signal.

Referring to FIG. 3, a satellite signal in the form of a spread spectrum signal received by the antenna 11 is supplied to the RF section 12. Meanwhile, an oscillation frequency, in the present example, an output of the reference frequency oscillator 13 formed from a quartz frequency oscillator of 18.414 MHz, is supplied to a local oscillation circuit 41. Consequently, a local oscillation output having a frequency ratio fixed with respect to the output frequency of the reference frequency oscillator 13 is obtained from the local oscillation circuit 41.

The local oscillation output is supplied to the RF section 12, by which the satellite signal is converted into a signal of a first intermediate frequency of a lower frequency band and is further converted into a second intermediate frequency signal Sif of a further lower second intermediate frequency (1.023 MHz) with the oscillation output of the reference frequency oscillator 13.

The second intermediate frequency signal Sif from the RF section 12 is supplied to a binary digitization circuit 42, by which it is compared in level with a predetermined threshold value so that it is binary digitized.

A binary output Sd of the binary digitization circuit 42 is supplied to a signal multiplier 43 formed from an exclusive OR circuit.

In the signal demodulation section shown in FIG. 3, a so-called tau dither tracing method is used for a feedback loop 50 for despreading demodulation while a costas loop is used for a feedback loop 60 for demodulating data bits. The feedback loop 50 and the feedback loop 60 have a digitization construction, and control signals for the feedback loop 50 and the feedback loop 60 are formed by software processing by a microcomputer 70.

In particular, in the feedback loop 50 for despreading demodulation, reference numeral 51 denotes a code generator for generating a PN code of the receiver side, and a composite PN code composed of an early (early) code Me and a late (late) code Md which have phase differences equal to a predetermined offset with respect to the phase (reference phase) of a reference PN code is obtained from the code generator 51. The composite PN code is supplied to the signal multiplier 43. In this instance, the composite PN code is produced by switching the early code Me and the late code Md for each 1 millisecond.

The signal multiplier 43 multiplies the composite PN code and the binary digitized intermediate frequency signal Sd from the binary digitization circuit 42.

In this instance, a clock generator 52 for generating a driving clock for controlling the phase and the frequency (chip rate) of the early and late PN codes from the code generator 51 is formed from a numerically controlled variable frequency oscillator (hereinafter refer to as NCO). The reference clock from the reference frequency oscillator 13 is supplied to the clock generator 52, and the clock generator 52 divides 18.414 MHz of the reference clock by 18 to form a driving clock of 1.023 MHz for the code generator 51 under the control of the microcomputer 70.

In the code generator 51, the phases and the frequencies of the early and late PN codes are controlled with the clock from the clock generator 52 having a controlled phase and a controlled frequency. Consequently, the PN code from the code generator 51 is controlled so that the phase and the frequency thereof may coincide with the phase and the frequency of the PN code included in the intermediate frequency signal Sd from the reference frequency oscillator 13 thereby to perform despreading.

The feedback loop 60 for demodulating data bits includes a carrier generator 61 formed from an NCO, a 90° phase shifter 62, first and second multipliers 63 and 64 each formed from an exclusive OR gate, a pair of low-pass filters 65 and 66 each formed from a counter, and the microcomputer 70 for forming a control signal to the carrier generator 61. The feedback loop is formed from a costas loop.

The reference clock from the reference frequency oscillator 13 is supplied to the carrier generator 61. The carrier generator 61 generates a carrier suitable for numerical control of the NCO by the microcomputer 70 from the reference clock.

The microcomputer 70 executes such functions as indicated as functioning blocks in a portion of FIG. 3 surrounded by a thin line based on program software. In particular, processing functions of the microcomputer 70 are described in connection with the functioning blocks of FIG. 3. Multiplication means 71 multiplies count values from the low-pass filters 65 and 66 each formed from a counter to obtain an output which corresponds to a phase difference between a carrier component in the reception signal and the carrier from the carrier generator 61 as a multiplication output and supplies the multiplication output to loop filter means 72.

Then in the GPS reception apparatus, the high precision frequency information Fst from the standard wave receiver section 20 and the frequency signal from the reference frequency oscillator 13 are supplied to the frequency measurement section 30. The frequency measurement section 30 measures the frequency displacement Δf of the frequency signal from the reference frequency oscillator 13 based on the high precision frequency information Fst as described above. Then, the information of the frequency displacement Δf is supplied to loop filter means 72 of the microcomputer 70.

The loop filter means 72 forms a signal for controlling the frequency or the phase of the output signal of the carrier generator 61 from the multiplication output of the multiplication means 71 and the information of the frequency displacement Δf from the frequency measurement section 30 and supplies the control signal to the carrier generator 61. The multiplication means 71 and the loop filter means 72 described above form part of the costas loop 60.

Absolute value detection means 73 and 74 detects absolute values of the count value outputs of the low-pass filters 65 and 66, respectively, and detection outputs of the low-pass filters 65 and 66 are added by addition means 75. The addition means 75 thus outputs a signal representative of a correlation level between the PN code from the code generator 51 and the PN code of the reception signal, that is, a correlation output.

The correlation output signal from the addition means 75 representative of the correlation level is supplied to loop filter means 76. The loop filter means 76 forms a numerical control signal for controlling the frequency or the phase of the output block of the clock generator 52, which produces a driving clock for the code generator 51, based on the correlation output signal.

As described above, in the GPS reception apparatus, even if the oscillation frequency of the reference frequency oscillator 13 is fluctuated by a temperature variation or a secular change, since the oscillation frequency variation is reflected on the output signal of the carrier generator 61, such a frequency search as in the prior art is unnecessary.

[Time Synchronization Method]

Subsequently, a time synchronization method in the GPS reception apparatus is described. First, an outline of the time synchronization method is described.

Figure 4:
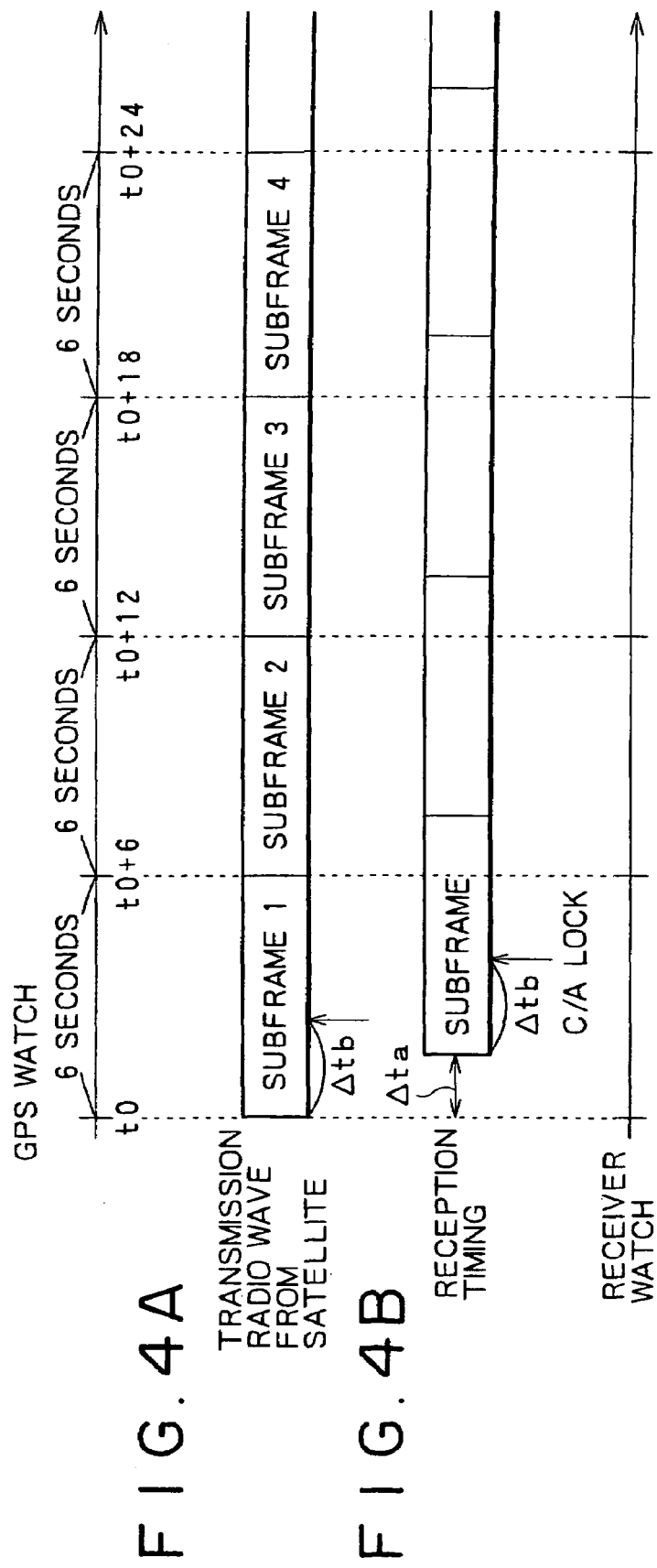
FIGS. 4A and 4B are diagrams showing a radio wave transmitted from a satellite and a reception timing of the radio wave, respectively, and illustrating a time synchronization method according to the present invention.

A radio wave from a satellite is transmitted, for example, in such a manner as seen in FIG. 4A in accordance with a GPS clock in the form of an atomic clock. The transmission radio wave is received by the GPS receiver after an arrival time Δta as seen in FIG. 4B.

In FIGS. 4A and 4B, the arrival time Δta is shown with reference to the point of time of the top of a subframe. However, even if the point of time of the top of a subframe cannot be discriminated, if the time of the boundary of particular data such as, for example, the boundary of one period of the spread code, the boundary of a bit or the boundary of a word is discriminated precisely and it is discriminated what numbered epoch of what number bit of what numbered word of the subframe the point of time of the boundary is, then this is equivalent to that the point of time of the top of the subframe is detected.

Thus, in the GPS reception apparatus, the time of the boundary of particular data such as, for example, the boundary of one period of the spread code, the boundary of a bit or the boundary of a word is discriminated precisely using high precision time information extracted by the standard wave receiver section 20, and then it is recognized what numbered epoch of what number bit of what numbered word of the subframe the point of time of the boundary is so that, even if the preamble or the TOW in the navigation message is not investigated, a time component longer than 1 millisecond is detected to establish time synchronism.

What numbered epoch of what number bit of what numbered word of a subframe the point of time of the boundary is can be determined in the following manner.

From trajectory data of the satellite stored in the storage section 15 of the GPS receiver section 10 and a rough arrival time Δta of the radio wave from the satellite can be discriminated. Thus, if the arrival time Δta is subtracted from the reception time of the satellite radio wave at the GPS receiver section 10, then the difference is substantially equal to the point of time of the top of the subframe of the information from the satellite.

Thus, if the arrival time Δta is subtracted from the time of the point of time of the boundary, then the time of a result of the subtraction becomes information of the point of time at which a time Δtb elapses from the top of the subframe as seen from FIG. 4A. If the time of the result of the subtraction is replaced with a bit or a clock of the spread code to perform calculation, then it can be discriminated what numbered epoch of what numbered bit of what numbered word of the subframe the point of time of the boundary is.

Accordingly, if the time information which can be utilized by the GPS reception apparatus has a predetermined degree of preciseness with respect to the GPS clock, then by acquiring the time of the boundary of particular data from the time information after synchronization of the C/A code is completed, accurate time synchronism can be established without investigating the preamble or the TOW of the navigation message.

By the way, the boundary of one period of a spread code can be detected readily. Also the boundary of a bit can be detected by detecting inversion of the spread code in a unit of one period. However, it is difficult to detect the boundary of a word because contents are different for each word. This also applies to the boundary of a subframe. Therefore, in the GPS reception apparatus described below, the boundary of one period of the spread code and the boundary of a bit are used.

As described hereinabove, when synchronism of the C/A code from a satellite is established, since the C/A code has one period of 1 millisecond, an arrival time of a radio wave from the satellite regarding a time component shorter than 1 millisecond can be known. In other words, when synchronism is established, the displacement amount of the spread code (PN code) with respect to the reference phase (by what number of chips the spread code is displaced from the reference phase) at the synchronization point of time is a time component on the order less than 1 millisecond of an arrival time of the wave from the satellite to the receiver. This is similar to the prior art.

In the time synchronization method used in the GPS reception apparatus, the GPS reception apparatus can acquire high precision time information at the standard wave receiver section 20 as described hereinabove.

In the foregoing description, in order to detect the boundary of one period of the spread code, it is necessary that the boundary be detected accurately with an error on the order of 500 microseconds. Meanwhile, in order to detect the boundary of a bit, it is only required that the boundary can be detected accurately with an error on the order of 10 milliseconds. Depending upon the difference in accuracy of time information which can be acquired by the GPS reception apparatus of the present embodiment, two forms are available as described below.

The problem of the accuracy of time information is described first.

Figure 5:
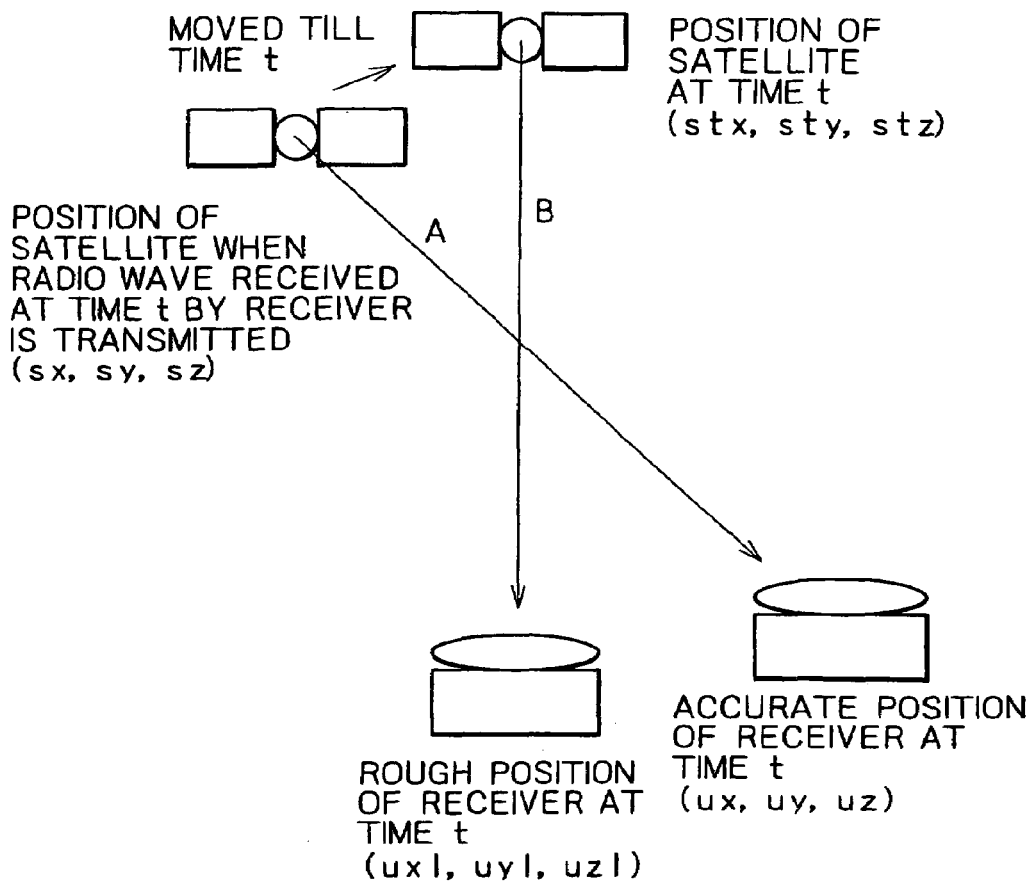
FIG. 5 is a diagrammatic view illustrating the time synchronization method of FIGS. 4A and 4B.

The difference between time data which can be acquired by the GPS reception apparatus and correct time data is represented by Δt1. Further, where, as seen in FIG. 5, a rough position of the GPS reception apparatus is represented by (ux1, uy1, uz1), an accurate position of the GPS reception apparatus by (ux, uy, uz), the position of the satellite at the time t by (stx, sty, stz), the position when the radio wave received by the GPS reception apparatus at the time t is transmitted from the satellite by (sx, sy, sz), and the velocity of light by c, the error Δt2 of the calculated propagation time of the radio wave from the satellite to the GPS reception apparatus can be represented, from FIG. 5, as $$\Delta t2 = |(sx-ux)^2 + (sy-uy)^2 + (sz-uz)^2)^{1/2} - ((stx-ux1)^2 + (sty-uy1)^2 + ((stz-uz1)^2)^{1/2}|/c$$

The error E which matters with the time information is $E=\Delta t1+\Delta t2$. Accordingly, in what manner a time component longer than 1 millisecond is obtained is different depending upon how high the value of the error E of time information which can be utilized by the GPS reception apparatus is.

[First Form of Time Synchronization]

In the first form of time synchronization, time information longer than 1 millisecond for time synchronization is determined from time information of the boundaries of one period of the PN code which is a spread signal, that is, the C/A code and of 1,023 chips. In this instance, the accuracy of the time information which can be utilized by the GPS reception apparatus must be $$E=\Delta t1+\Delta t2<500 \text{ microseconds}$$

Here, the time information acquired by the standard wave receiver section 20 satisfies this condition.

Figure 6:
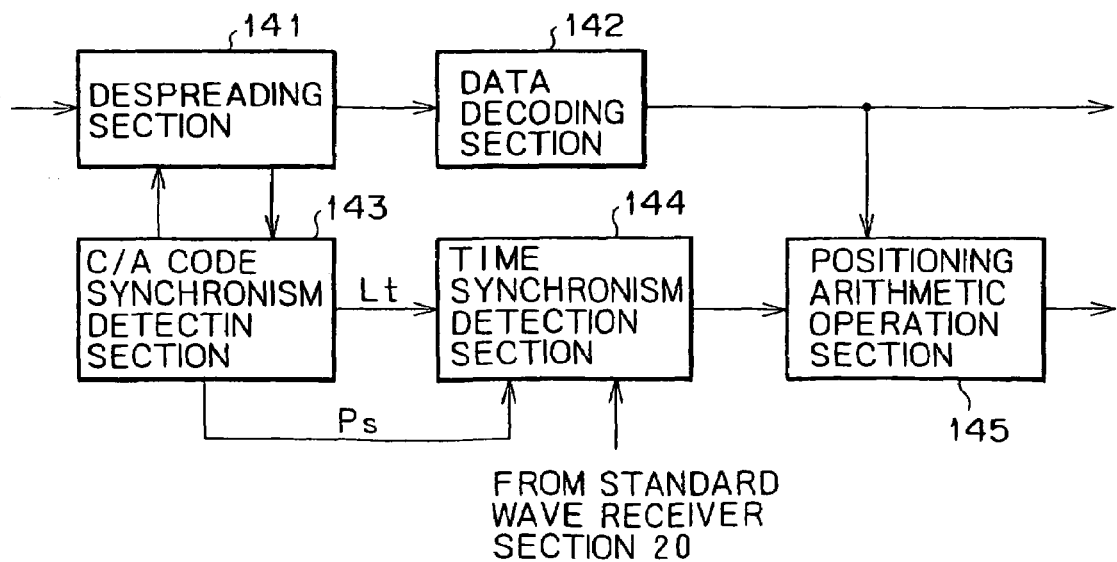
FIG. 6 is a block diagram showing an apparatus for executing the time synchronization method of FIG. 5.

FIG. 6 illustrates time synchronization of the demodulation and arithmetic operation section 14 of FIG. 1 in the present first form. Referring to FIG. 6, all or some of blocks of the demodulation and arithmetic operation section 14 in this instance can be formed from a microcomputer.

In particular, an intermediate frequency signal from the RF section 12 is supplied to a despreading section 141. To the despreading section 141, a PN code for despreading is supplied from a C/A code synchronism detection section 143 which includes the PN code generator 51. The C/A code synchronism detection section 143 controls the generation phase of the PN code based on the correlation detection information from the despreading section 141 to perform synchronism detection with the C/A code. Then, the C/A code synchronism detection section 143 locks the phase of the PN code at the phase with which synchronism is established.

After the synchronization of the C/A code is completed, a GPS satellite signal which has been in a spread spectrum modulated state is obtained in a demodulated form from the despreading section 141 and is supplied to a data decoding section 142.

The data decoding section 142 decodes the ephemeris information and the almanac information and outputs the decoded information. The information of the navigation message is stored, for example, into the storage section 15 and supplied to a positioning arithmetic operation section 145.

Further, the C/A code synchronism detection section 143 supplies a signal Lt representative of the time at which synchronism of the C/A is established to a time synchronism detection section 144. Further, in the present form, the C/A code synchronism detection section 143 supplies a signal Ps representative of the boundary of one period of the PN code to the time synchronism detection section 144. It is to be noted that the signal Lt representative of the timing at which synchronism of the C/A code is established is produced by the microcomputer 70 in FIG. 3.

The time synchronism detection section 144 determines time information shorter than 1 milliseconds for time synchronization from the signal Lt representative of the time at which synchronism of the C/A code is established. The time synchronism detection section 144 further determines time information longer than 1 millisecond for time synchronization based on the signal Ps representative of the boundary of one period of the PN code after completion of the synchronization of the C/A code to establish time synchronism for positioning arithmetic operation.

Figure 7:
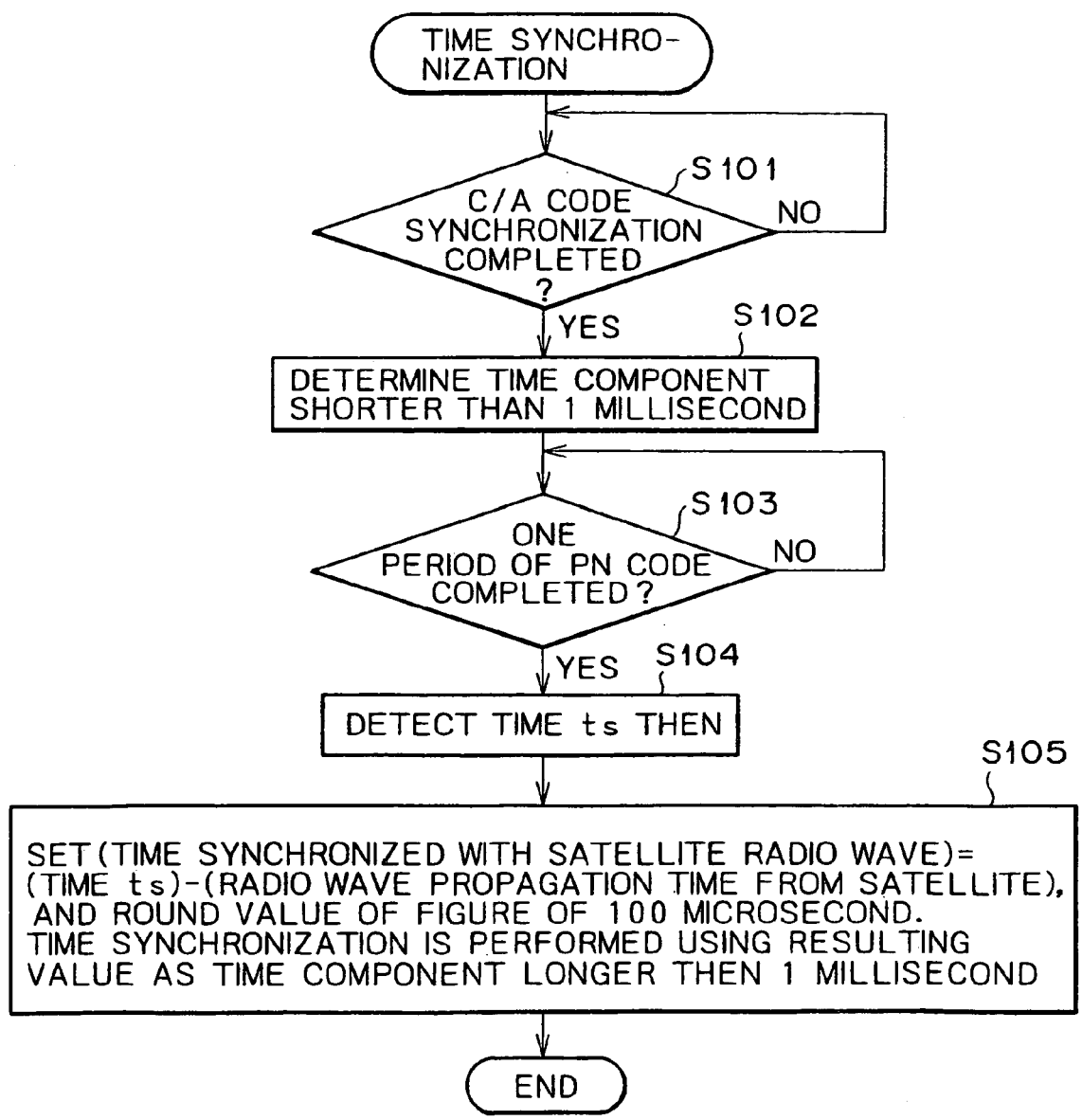
FIG. 7 is a flow chart illustrating operation of the apparatus of FIG. 6.

FIG. 7 illustrates a flow of processing executed by the time synchronism detection section 144.

Referring to FIG. 7, the time synchronism detection section 144 first discriminates whether or not synchronization of the C/A code is completed by discriminating whether or not the signal Lt is acquired (step S101). Then, if it is discriminated that synchronization of the C/A code is completed, then the time synchronism detection section 144 determines a time component shorter than 1 millisecond for time synchronization (step S102).

Then, the time synchronism detection section 144 waits that one period of the PN is completed and the boundary of the period of the PN code comes (step S103). Then, after the time synchronism detection section 144 confirms from the signal Ps representative of the boundary of one period of the PN code that the boundary of the period of the PN code comes, the time synchronism detection section 144 detects the time ts then from the high precision time information Tst from the standard wave receiver section 20 (step S104).

Then, as described above, the time synchronism detection section 144 subtracts the radio wave propagation time which is a rough arrival time of the radio wave from the satellite from the time ts then and rounds the value of the figure of 100 microseconds of a result of the subtraction to determine time information longer than 1 millisecond for time synchronization. Then, the time synchronism detection section 144 establishes time synchronization from the time information and sends a result of the same to the positioning arithmetic operation section 145 (step S105).

Here, the radio wave propagation time which is an arrival time of the radio wave from the satellite can be represented by the following expression:

$$((stx-ux1)^2+(sty-ny1)^2+(stz-uz1)^2)^{1/2}/c$$

The time synchronization processing by the time synchronism detection section 144 is ended thereby.

The positioning arithmetic operation section 145 calculates the distance between the satellite and the GPS reception apparatus based on the information of the time synchronization described above. In particular, such time synchronism as described above is established for a number of satellites necessary for positioning arithmetic operation, that is, usually for three satellites where two-dimensional position is to be performed, but for four satellites where three-dimensional positioning is to be performed. Then, when the distances between the individual satellites and the GPS reception apparatus are calculated, positioning arithmetic operation is performed and a result of the same is outputted.

When the synchronization of the C/A is completed in this manner and then the boundary of one period of the PN code is detected, in the present form, time synchronism is established as pre-processing to positioning arithmetic operation, and then positioning arithmetic operation can be performed. Consequently, when compared with the conventional method which uses the preamble or the TOW and by which the position is obtained only in a unit of 6 seconds, the time until the position is determined can be shortened, which contributes to power saving.

Besides, since, in the present form, a frequency search with the frequency variation of the oscillation frequency of the reference frequency oscillator 13 taken into consideration need not be performed as described above, also the time required to catch the satellite signal can be shortened by a time required for the frequency search. Accordingly, also in this regard, the time until positioning arithmetic operation is started can be shortened further, which leads to power saving.

Figure 8:
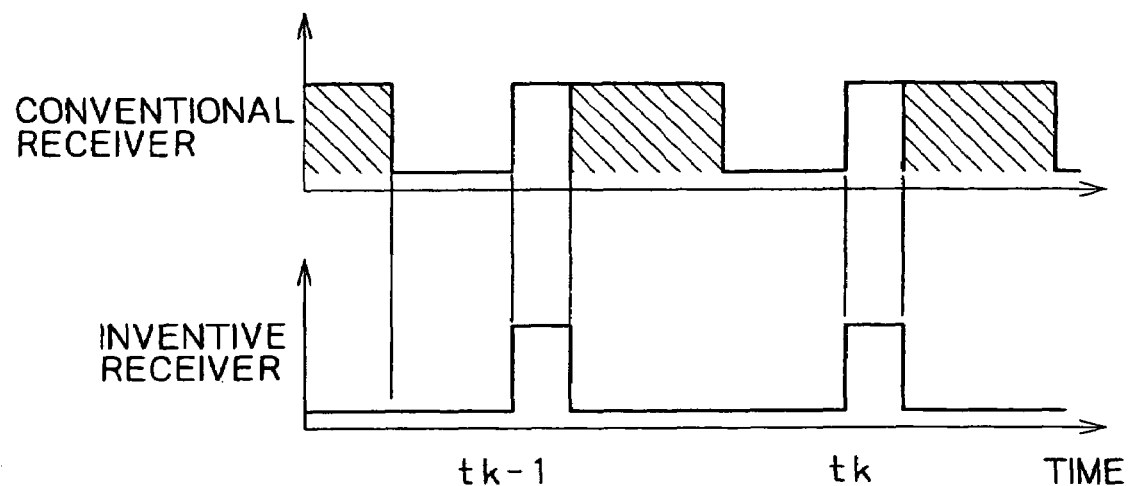
FIG. 8 is a diagram illustrating a power saving performance of the GPS reception apparatus of the present invention in comparison with a conventional GPS reception apparatus.

For example, when a GPS reception apparatus is driven intermittently as seen in FIG. 8, while the time until the position is determined is long and power consumption for the time matters with a conventional GPS reception apparatus, in the present invention, the time until the position is determined is shortened as described above, and the power consumption at portions having slanting lines added thereto from within power consumption of a conventional GPS reception apparatus in FIG. 8 can be reduced.

Further, power saving of the GPS receiver can be anticipated in this manner, and since the time until the position is recognized is shortened, a waiting time of the user decreases, and the stress of the user can be reduced.

Figure 9:
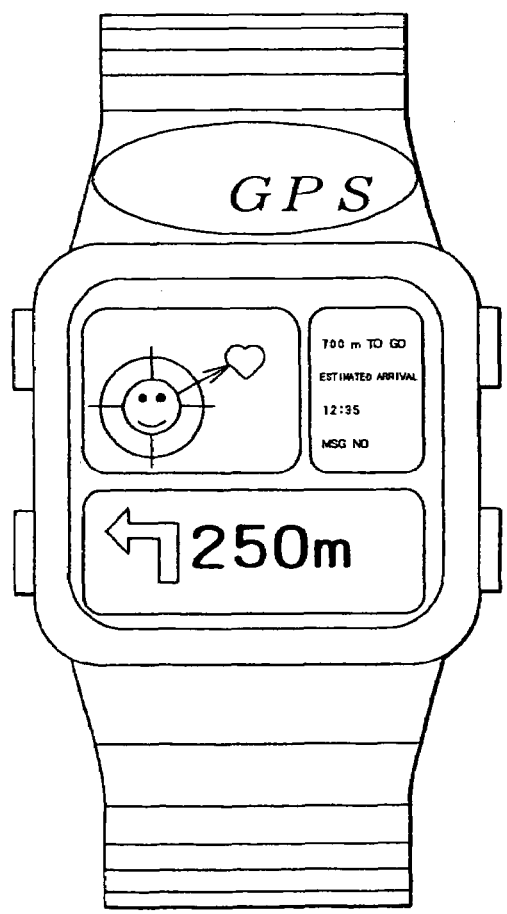
FIG. 9 is a schematic view showing an example of an application of the GPS reception apparatus according to the present invention.

Further, since the capacity of a battery necessary to drive the GPS receiver can be reduced due to the power saving, the GPS reception apparatus can be applied a very small positioning and precision time measuring instrument such as, for example, a wrist watch type measuring instrument shown in FIG. 9.

[Second Form of Time Synchronization]

In the second form of time synchronization, time information longer than 1 millisecond for time synchronization is determined from time information of the boundary of a bit of spread spectrum demodulated data. In the present second form, the accuracy of time information which can be utilized by the GPS reception apparatus must be $$E = \Delta t1 + \Delta t2 < 10 \text{ milliseconds}$$

Figure 10:
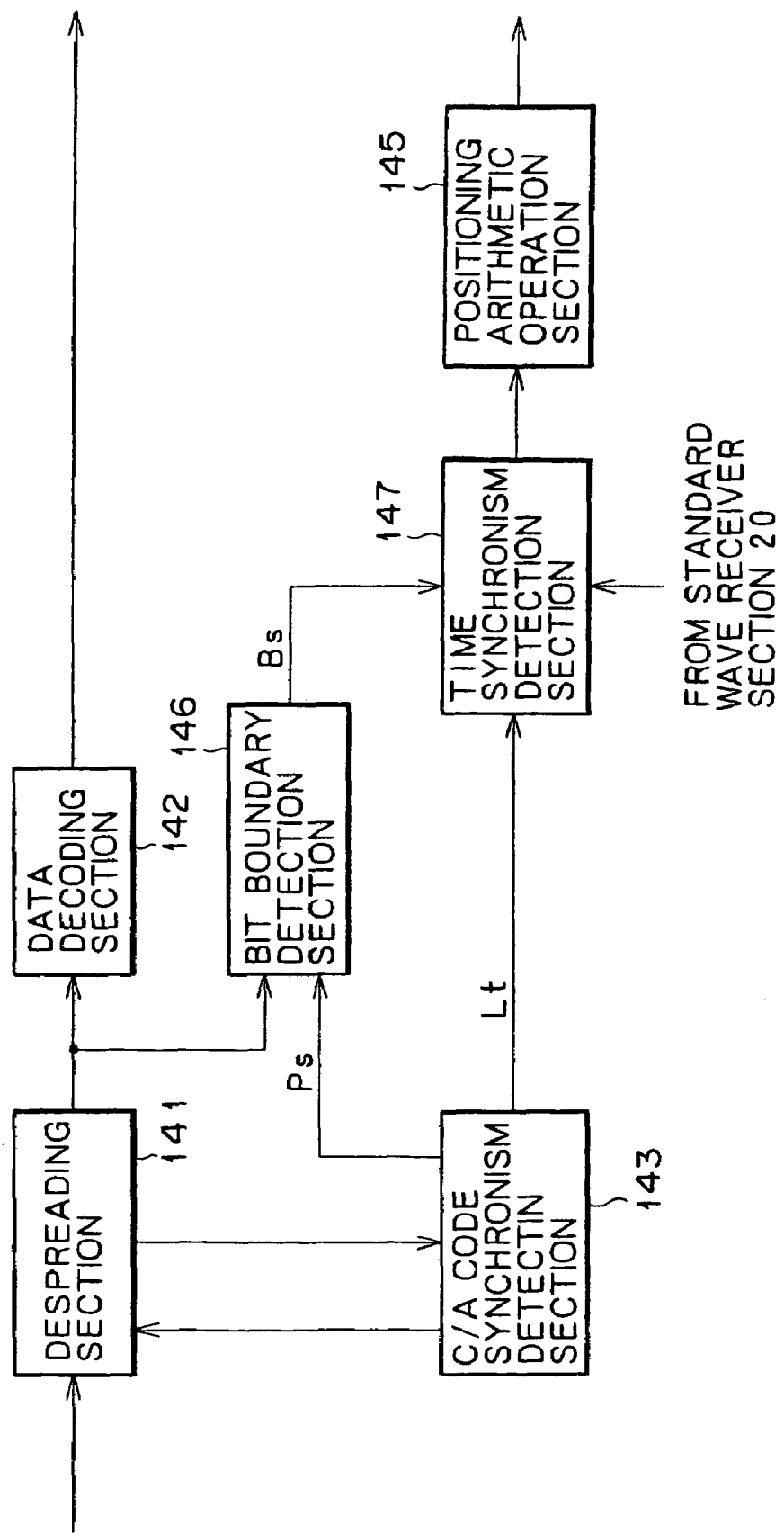
FIG. 10 is a block diagram showing another apparatus for executing the time synchronization method of FIG. 5.

FIG. 10 illustrates time synchronization of the demodulation and arithmetic operation section 14 of FIG. 1 in the second form. Similarly as in the first form, all or some of blocks of the demodulation and arithmetic operation section 14 shown can be formed from a microcomputer. It is to be noted that the like parts or elements are denoted by like reference symbols as in the first form, so that the explanations are omitted.

In the present second form, the demodulation and arithmetic operation section 14 is a modification to but is different from the demodulation and arithmetic operation section 14 described hereinabove with reference to FIG. 6 in that it includes a bit boundary detection section 146 and a time synchronism detection section 147 in place of the time synchronism detection section 144. To the bit boundary detection section 146, spread spectrum demodulated data from the despreading section 141 and information Ps representative of the boundary of a period of the PN code from the C/A code synchronism detection section 143 are supplied.

The bit boundary detection section 146 makes use of the fact that a bit corresponds to 20 periods of the PN code and the phase of the C/A code when the bit is "0" is inverse to the phase of the C/A code when the bit is "1" as seen in FIG. 13 to detect the boundary of a bit and supplies a signal Bs representative of the timing of the detected boundary of the bit to the time synchronism detection section 147.

To the time synchronism detection section 147, a signal representative of the timing at which synchronism of the C/A is established is supplied from the C/A code synchronism detection section 143 similarly as in the first preferred embodiment.

The time synchronism detection section 147 determines time information shorter than 1 millisecond for time synchronization from the signal Lt representative of the timing at which synchronism of the C/A code is established. The time synchronism detection section 147 determines time information longer than 1 millisecond for time synchronization based on the signal Bs representative of the boundary of a bit after completion of the synchronization of the C/A code and establishes time synchronization for positioning arithmetic operation.

Figure 11:
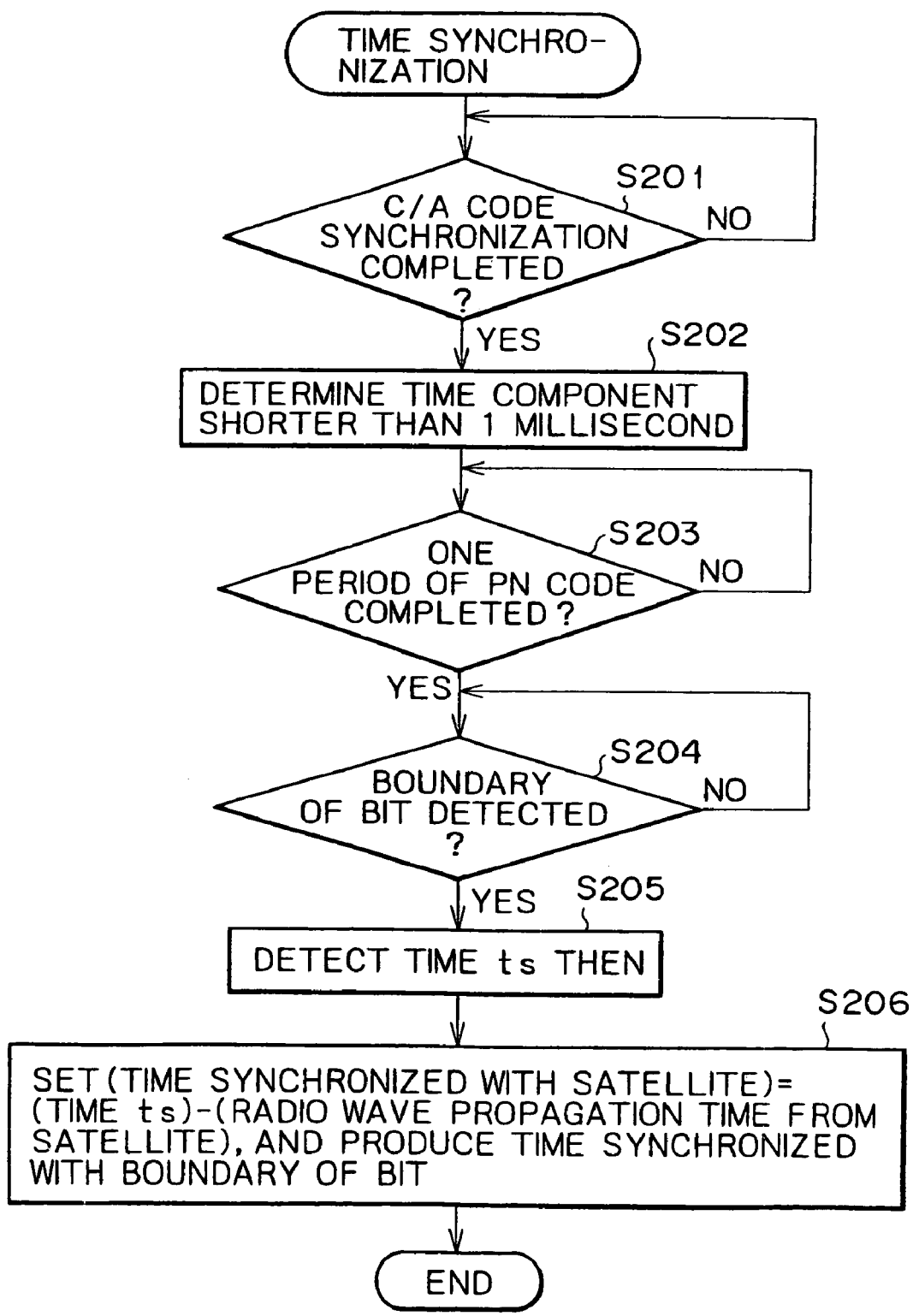
FIG. 11 is a flow chart illustrating operation of the apparatus of FIG. 10.

FIG. 11 illustrates a flow of processing performed by the time synchronism detection section 147.

Referring to FIG. 11, the time synchronism detection section 147 first discriminates whether or not synchronization of the C/A code is completed by discriminating whether or not the signal Lt described above is obtained (step S201). Then, when the time synchronism detection section 147 discriminates that synchronization of the C/A code is completed, it determines a time component shorter than 1 millisecond for time synchronization (step S202).

Then, the time synchronism detection section 147 waits that the boundary of a bit is detected (step S203). Then, after the time synchronism detection section 147 confirms from the signal Bs representative of the boundary of a bit that the boundary of a bit comes, then it detects the time ts then from the high precision time information Tst obtained by the standard wave receiver section 20 (step S204).

Then, as described hereinabove, the time synchronism detection section 147 subtracts the radio wave propagation time, which is a rough arrival time of a radio wave from the satellite, from the time ts then, and adds or subtracts a time error smaller than $\Delta t1 + \Delta t2$ to or from the time of a result of the subtraction to produce a time which is a multiple of 20 milliseconds. Then, the time synchronism detection section 147 establishes time synchronism from the time information and sends a result of the same to the positioning arithmetic operation section 145 (step S205). The time synchronization processing by the time synchronism detection section 147 comes to an end therewith.

The positioning arithmetic operation section 145 calculates the distance between the satellite and the GPS reception apparatus based on the information of the time synchronization described above. Then, when the distance of the GPS reception apparatus from a number of satellites necessary for positioning arithmetic operation, that is, usually for three satellites where two-dimensional position is to be performed, but for four satellites where three-dimensional positioning is to be performed, positioning arithmetic operation is performed and a result of the same is outputted.

When the synchronization of the C/A is completed in this manner and then the boundary of a bit is detected, in the present for, time synchronism is established as pre-processing to positioning arithmetic operation, and then positioning arithmetic operation can be performed. Consequently, when compared with the conventional method which uses the preamble or the TOW and by which the position is obtained only in a unit of 6 seconds, the time until the position is determined can be shortened, which contributes to power saving, similarly to the first form described hereinabove.

Further, in the present second form, in addition to the effects achieved by the first form described hereinabove, the accuracy in time required by the GPS reception apparatus may be lower than that of the first preferred embodiment. Consequently, the application to such apparatus as a wrist watch type instrument of FIG. 9 described hereinabove is further facilitated.

It is to be noted that, in the two forms described above, while synchronism is kept stably, the positioning arithmetic operation section 145 performs detection of the preamble or the TOW of a navigation message to acquire time information longer than 1 millisecond for time synchronization. Further, the positioning arithmetic operation section 145 performs time synchronization using the time information to perform positioning arithmetic operation.

Alternatively, however, time information longer than 1 millisecond for time synchronization may naturally be acquired normally based on the time of the boundary of one period of the PN code or the boundary of a bit described hereinabove without using the preamble or the TOW.

[Another Preferred Embodiment]

Figure 12:
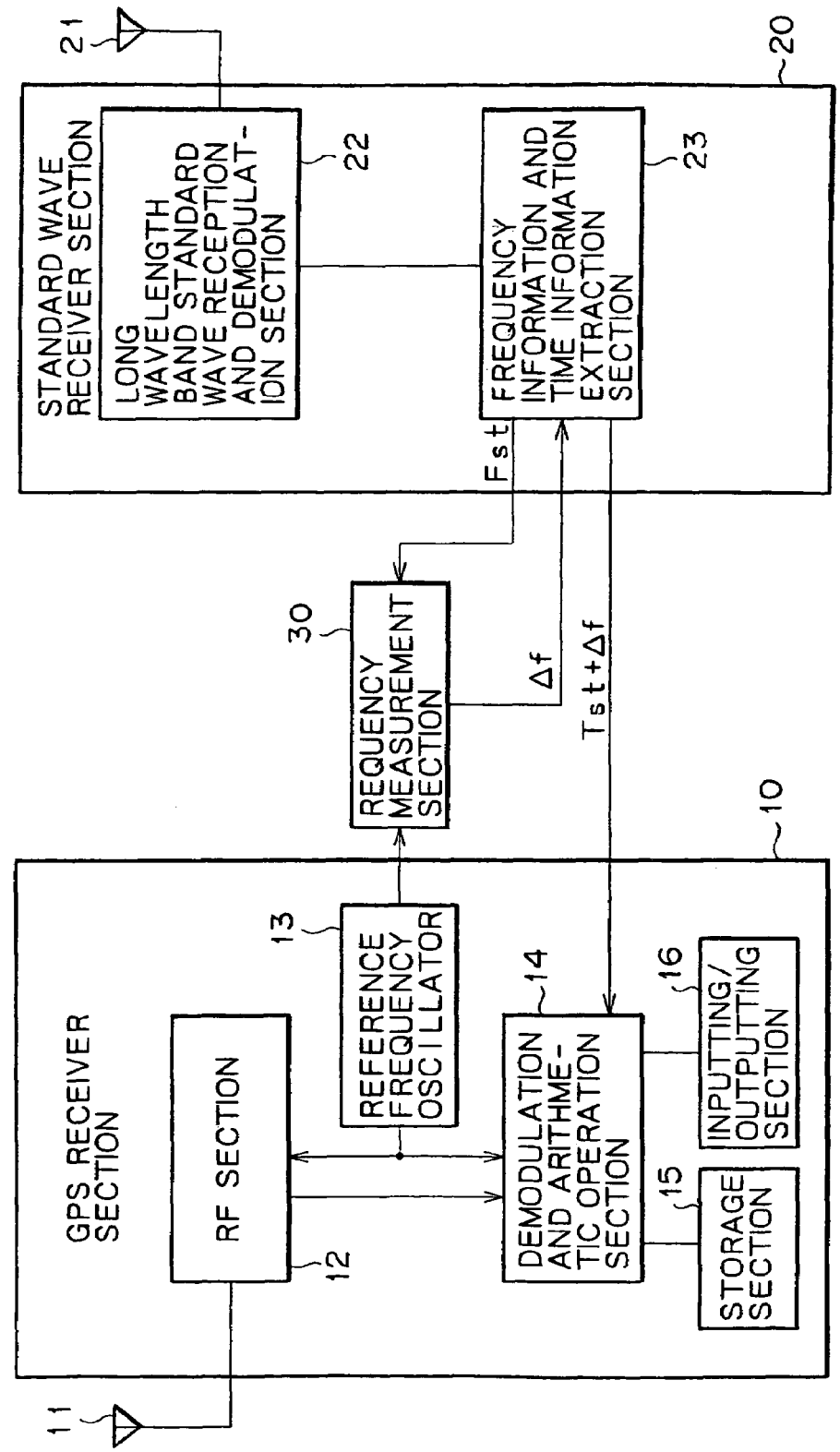
FIG. 12 is a block diagram showing a construction of a GPS reception apparatus according to another preferred embodiment of the present invention.
Figure 14:
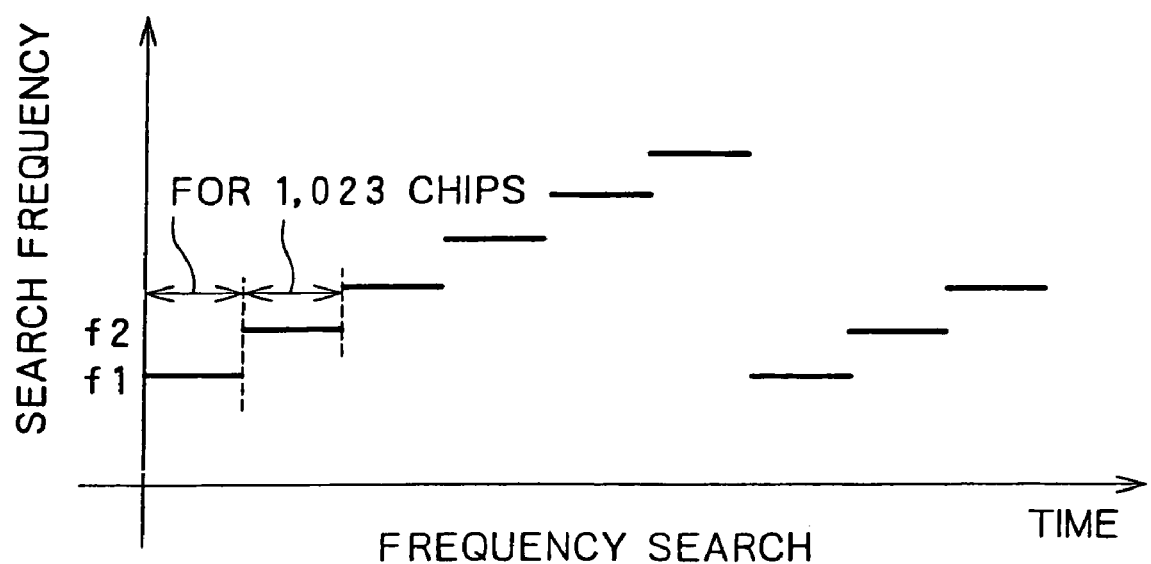
FIG. 14 is a diagram illustrating a frequency search in a conventional GPS receiver.

FIG. 12 shows a construction of another GPS reception apparatus according to the present invention. The GPS reception apparatus of the present embodiment is a modification to and includes common components to those of the GPS reception apparatus of the first preferred embodiment of FIG. 1. The GPS reception apparatus of the present embodiment, however, is different from the GPS reception apparatus of FIG. 1 principally in that, even when power to the GPS receiver section 10 is switched off, a power supply voltage is normally supplied to the reference frequency oscillator 13 of the GPS receiver section 10. Further, information of the frequency displacement Δf of the reference frequency oscillator 13 measured by the frequency measurement section 30 is supplied to the frequency information and time information extraction section 23 of the standard wave receiver section 20.

The frequency information and time information extraction section 23 in the GPS reception apparatus of FIG. 12 supplies not only the time information Tst but also the information of the frequency displacement Δf acquired from the frequency measurement section 30 to the demodulation and arithmetic operation section 14 of the GPS receiver section 10.

Accordingly, even if power is not connected to the GPS receiver section 10 which exhibits high power consumption, measurement regarding the frequency displacement Δf of the reference frequency oscillator 13 is performed, and a result of the measurement is delivered from the standard wave receiver section 20 to the GPS receiver section 10. Consequently, the time until positioning arithmetic operation is started after power is made available to the GPS receiver section 10 can be shortened.

Other Preferred Embodiments

While, in the preferred embodiments described above, information of the frequency displacement Δf from the frequency measurement section 30 is used to control the carrier generator 61 of the costas loop 60, alternatively the clock generator 52 of the feedback loop 50 for despreading demodulation may be controlled using the information of the frequency displacement Δf from the frequency measurement section 30.

Further, where the reference frequency oscillator 13 itself has a construction of an oscillator whose frequency is controllable, the oscillation frequency of the reference frequency oscillator 13 itself may be controlled using the information of the frequency displacement Δf from the frequency measurement section 30.

Further, while the frequency measurement section 30 measures the frequency displacement Δf, it is otherwise possible to use, without detecting the frequency displacement Δf, the high precision high precision frequency information Fst from the standard wave receiver section 20 to measure the oscillation frequency of the reference frequency oscillator 13 and control the carrier generator 61, the code generator 51 or the reference frequency oscillator 13 itself in response to a result of the measurement.

While preferred embodiments of the present invention have been described using specific terms, such description is for illustrative purposes only, and it is to be understood that changes and variations may be made without departing from the spirit or scope of the following claims.

What is claimed is:

1. A GPS positioning method, comprising the steps of:
   acquiring high precision frequency information provided by a standard wave;
   measuring an oscillation frequency of a reference oscillator used in a GPS receiver section or a frequency variation of the oscillation frequency using the received high-precision frequency information;
   utilizing the result of the measurement to acquire a signal from a GPS satellite;
   acquiring high precision time information provided by the standard wave;
   performing a positioning arithmetic operation using the high precision time information in place of time information sent from said GPS satellite; and
   a first step of detecting a synchronization timing regarding a spread code of a spread spectrum signal from said GPS satellite to detect a time component shorter than one period of the spread code for time synchronization.

2. A GPS positioning method according to claim 1, further comprising:
   detecting, after the synchronization of the spread code is completed in the first step, a time at a boundary of one period of the spread code from the high precision time information provided by the standard wave and detecting a time component longer than one period of the spread code for the time synchronization based on the time of the boundary.

3. A GPS positioning method according to claim 1, further comprising:
   detecting, after the synchronization of the spread code is completed in the first step, a boundary of a bit of information from said satellite, detecting the time of the boundary of the bit with the high precision time information provided by the standard wave and detecting a time component longer than one period of the spread code for the time synchronization.

4. A GPS positioning method according to claim 1, wherein, even when power to said GPS receiver section is off, power is kept supplied to said frequency oscillator of said GPS receiver section so that the frequency of said frequency oscillator or a frequency variation of the frequency is measured using the high precision frequency information provided by the received standard wave.

5. A GPS positioning method according to claim 4 wherein the measured oscillation frequency of said reference frequency oscillator or the measured frequency variation of the oscillation frequency is reflected on an output signal of a carrier generator of a costas loop for acquiring a signal from said GPS satellite.

6. A GPS positioning method according to claim 1, wherein the measured oscillation frequency of said reference frequency oscillator or the measured frequency variation of the oscillation frequency is reflected on an output signal of a carrier generator of a costas loop for acquiring a signal from said GPS satellite.

7. A GPS reception apparatus, comprising:
   a GPS receiver section configured to receive a radio wave from a GPS satellite to perform positioning arithmetic operation;

a standard wave receiver section configured to receive a standard wave to acquire high precision frequency information;

a frequency measurement section configured to measure an oscillation frequency of a reference frequency oscillator used in said GPS receiver section or a frequency variation of the oscillation frequency using the high precision frequency information acquired by said standard wave receiver section;

said GPS receiver section utilizing a result of the measurement by said frequency measurement section to acquire a signal from said GPS satellite;

said standard wave receiver section acquires high precision time information and supplies the high precision time information to said GPS receiver section;

said GPS receiver section performs positioning arithmetic operation using the high precision time information in place of time information sent thereto from said GPS satellite;

said GPS receiver section includes a configured to receive a radio wave from said GPS satellite;

a memory configured to store at least trajectory information of said GPS satellite;

synchronism detection means for detecting synchronism of a spread code of a spread spectrum signal wave from said GPS satellite received by said receiver; and time synchronism detection means for determining a synchronism time point detected by said synchronism detection means as a time component shorter than one period of the spread code for time synchronization.

8. A GPS reception apparatus according to claim 7, wherein; and said time synchronism detection means acquires a time at a boundary of one period of the spread code using the high precision time information from said standard wave reception section, determines a time component longer than one period of the spread code for the time synchronization based on the acquired time of the boundary and establishes the time synchronism.

9. A GPS reception apparatus according to claim 7, wherein said GPS receiver section includes:

bit boundary detection means for detecting a boundary of a bit of information from said satellite; and said time synchronism detection means for acquiring a time of the boundary of a bit detected by said bit boundary detection means using the high precision time information from said standard wave reception section, determining a time component longer than one period of the spread code for the time synchronization based on the acquired time at the boundary and establishing the time synchronism.

10. A GPS reception apparatus according to claim 7, wherein, even when power is off to said GPS receiver section, power is supplied to said frequency oscillator and said frequency measurement section measures the oscillation frequency of said frequency oscillator or the frequency variation of the oscillation frequency using the high precision frequency information acquired by said standard wave reception section.

11. A GPS reception apparatus according to claim 10, wherein the oscillation of frequency of said reference frequency oscillator or the frequency variation of the oscillation frequency measured by said frequency measurement section is reflected on an output signal of a carrier generator of a costas loop for acquiring a signal from said GPS satellite.

12. A GPS reception apparatus according to claim 7, wherein the oscillation frequency of said reference frequency oscillator or the frequency variation of the oscillation frequency measured by said frequency measurement section is reflected on an output signal of a carrier generator of a costas loop for acquiring a signal from said GPS satellite.

* * * * *

UNITED STATES PATENT AND TRADEMARK OFFICE
CERTIFICATE OF CORRECTION

| | |
|---|---|
| PATENT NO. | : 7,266,140 B1 |
| APPLICATION NO. | : 09/685412 |
| DATED | : September 4, 2007 |
| INVENTOR(S) | : Koji Hasegawa et al. |

It is certified that error appears in the above-identified patent and that said Letters Patent is hereby corrected as shown below:

Column 19, Line 22, insert: --a receiver configured to receive a radio wave from said GPS satellite;--.

Signed and Sealed this

Twenty-fourth Day of June, 2008

JON W. DUDAS
*Director of the United States Patent and Trademark Office*